(12) United States Patent
Kegasa et al.

(10) Patent No.: US 11,534,914 B2
(45) Date of Patent: Dec. 27, 2022

(54) METHOD AND SYSTEM FOR TEACHING ROBOT

(71) Applicant: KAWASAKI JUKOGYO KABUSHIKI KAISHA, Kobe (JP)

(72) Inventors: Yoshinori Kegasa, Sumoto (JP); Takehiko Murata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/051,030

(22) PCT Filed: Apr. 26, 2019

(86) PCT No.: PCT/JP2019/017972
§ 371 (c)(1),
(2) Date: Oct. 27, 2020

(87) PCT Pub. No.: WO2019/208785
PCT Pub. Date: Oct. 31, 2019

(65) Prior Publication Data
US 2021/0046643 A1 Feb. 18, 2021

(30) Foreign Application Priority Data
Apr. 27, 2018 (JP) .............................. JP2018-087229

(51) Int. Cl.
*B25J 9/16* (2006.01)
*G05B 19/402* (2006.01)

(52) U.S. Cl.
CPC ............. *B25J 9/163* (2013.01); *B25J 9/1676* (2013.01); *G05B 19/402* (2013.01); *G05B 2219/50391* (2013.01)

(58) Field of Classification Search
CPC ........ B25J 9/163; B25J 9/1676; B25J 9/1666; B25J 19/06; G05B 19/402; G05B 2219/50391; G05B 2219/39082; G05B 2219/50048; G05B 19/425
See application file for complete search history.

(56) References Cited

FOREIGN PATENT DOCUMENTS

| JP | H02-41881 A | * | 2/1990 | |
| JP | H02-41881 A | | 2/1990 | |
| JP | H07-100755 A | | 4/1995 | |
| JP | 2007144537 A | * | 6/2007 | |
| JP | 2008254172 A | * | 10/2008 | ........... G05B 19/425 |
| JP | 2009-279677 A | | 12/2009 | |
| JP | 2012-245577 A | | 12/2012 | |
| JP | 2013-136123 A | | 7/2013 | |

(Continued)

OTHER PUBLICATIONS

JP-H02-41881-A—English Translation (Year: 1990).*

(Continued)

*Primary Examiner* — Dale Moyer
(74) *Attorney, Agent, or Firm* — Oliff PLC

(57) ABSTRACT

A robot teaching system includes a teaching unit and a robot including a robotic arm and a robot controller. In the robot teaching system, a workpiece includes an internal space having an opening, and a target object of a work by the end effector exists in the internal space. The robot controller determines a possibility that the arm part interferes with an edge of the opening while the robotic arm is jogging or inching.

12 Claims, 6 Drawing Sheets

(56) References Cited

FOREIGN PATENT DOCUMENTS

JP          2013136123 A  *  7/2013
JP          2014-231137 A    12/2014

OTHER PUBLICATIONS

JP-2008254172-A—English Translation (Year: 2008).*
JP-2013136123-A—English Translation (Year: 2013).*
JP-2007144537-A—English Translation (Year: 2007).*

* cited by examiner

METHOD AND SYSTEM FOR TEACHING ROBOT

TECHNICAL FIELD

The present disclosure relates to a method and system for teaching a robot.

BACKGROUND ART

Conventionally, methods of teaching robots are known, in which teaching data for the robots is automatically generated offline based on computer-aided design (CAD) data (e.g., Patent Document 1).

REFERENCE DOCUMENT OF CONVENTIONAL ART

Patent Document

[Patent Document 1] JP1995-100755A

DESCRIPTION OF THE DISCLOSURE

Problems to be Solved by the Disclosure

However, the teaching data automatically generated offline as described above (hereinafter, referred to as "offline automatically-generated teaching data") has the following problems.

A product subject to a work of a robot has, for example, a manufacturing error and an assembling error of components, and thus, using the offline automatically-generated teaching data as it is may cause trouble to the work. Moreover, since the offline automatically-generated teaching data is not suitable for the actual work, a work efficiency of the robot may decrease. Therefore, at a work site where the robot is actually used, the offline automatically-generated teaching data is adjusted so as to adapt to the actual work because it cannot be used as it is.

Meanwhile, when a teaching for the adjustment of the offline automatically-generated teaching data is performed by operating a robotic arm using a teaching unit such as a teach pendant, the following problem may occur.

When the robot performs a work to a semi-finished product, the robotic arm may enter into an internal space with an opening, and an end effector at a tip-end part of the robotic arm may perform a work inside the internal space. When teaching such an internal work, since a posture of the robotic arm changes according to a position of the end effector, it is necessary to paying attention to whether the robotic arm does not interfere with an edge of the opening.

The present disclosure is made in order to solve the above problems, and one purpose thereof is to provide a method and system for teaching a robot, unnecessary of paying attention to an interference between a robotic arm and an edge of an opening when a teaching is performed for a work inside an internal space having the opening by operating a teaching unit.

Summary of the Disclosure

In order to achieve the purpose, a method of teaching a robot according to one aspect of the present disclosure is a method of teaching a robot including a robotic arm and a robot controller, the robotic arm being provided with an end effector at a tip-end part of an arm part of the robotic arm, and the robot controller controlling operation of the robotic arm and setting a teach point according to operation of a teaching unit. A workpiece includes an internal space having an opening, and a target object of a work by the end effector exists in the internal space. The method includes the step of causing the robotic arm to perform one of jogging and inching by a jogging operation or an inching operation of the teaching unit, and determining by the robot controller a possibility that the arm part interferes with an edge of the opening while the robotic arm is jogging or inching. Here, "Jogging" refers to an operation in which the robotic arm operates while an input operation is performed to a user interface (pressing operation when the user interface is a push-button). "Inching" refers to an operation in which the robotic arm operates by a given operating amount (given distance) when one input operation is performed to the user interface.

According to this configuration, since the robot controller determines a possibility that the arm part interferes with the edge of the opening while the robotic arm is jogging or inching, it is unnecessary to pay attention to the interference between the robotic arm and the edge of the opening when the teaching of the robot is performed by operating the teaching unit.

Further, the causing the robotic arm may include (a) operating the robotic arm so that, after the robotic arm enters the end effector into the internal space of the workpiece through the opening by the jogging or the inching operation of the teaching unit, the robotic arm performs a work against the target object inside the internal space using the end effector while the robotic arm is jogging or inching. (a) The operating the robotic arm may include (a1) setting a plurality of teach points that realize the operation of the robotic arm in (a) the operating the robotic arm, by a teach-point setting operation of the teaching unit, and (a2) determining by the robot controller the possibility that the arm part interferes with the edge of the opening while the robotic arm is jogging or inching.

According to this configuration, in (a) the operating the robotic arm so that, after the robotic arm enters the end effector into the internal space of the workpiece through the opening, the robotic arm performs a work against the target object inside the internal space using the end effector while the robotic arm is jogging or inching, the possibility that the arm part interferes with the edge of the opening is determined. Therefore, it is unnecessary to pay attention to the interference between the robotic arm and the edge of the opening when the teaching is performed for the work inside the internal space having the opening by operating the teaching unit.

The method may further include, when determined that there is the possibility of the arm part interfering with the edge of the opening, controlling the operation of the robotic arm by the robot controller to evade the interference between the arm part and the edge of the opening, or controlling a warning unit by the robot controller to alert.

According to this configuration, when determined that there is the possibility of the arm part interfering with the edge of the opening, the interference between the robotic arm and the edge of the opening is evaded or the warning is issued so that the interference between the robotic arm and the edge of the opening is evaded suitably.

The method may further include (b) repeating: (b1) locating the end effector at a defined point that defines the opening of the workpiece, by the jogging operation or the inching operation of the teaching unit; and (b2) setting by the robot controller a position and a defined order of the defined point so as to be associated with each other, by a defined-point setting operation of the teaching unit. The opening may be identified by connecting a plurality of defined points with straight lines in the defined order, the plurality of defined points being set repeatedly in (b) the repeating.

According to this configuration, by operating the robotic arm by the teaching unit at a work site, the opening can be defined easily.

Further, the internal space of the workpiece may include a plurality of openings. The method may further include (c) selecting one of the plurality of openings of the workpiece by a selecting operation of the teaching unit before (a) the operating the robotic arm. For the selected opening, one of (a) the operating the robotic arm, (a) the operating the robotic arm and (b) the repeating, and (a) the operating the robotic arm, (b) the repeating and (c) the selecting one of the plurality of openings, may be performed.

According to this configuration, when the internal space of the workpiece includes the plurality of openings, the teaching for the work inside the internal space having the openings can be carried out by selecting an opening.

Further, the workpiece may be a vehicle body of an automobile under assembly, and the opening may be a window of a door of the vehicle body.

According to this configuration, the work inside the vehicle body can be performed using the robot through the window of the automobile without paying attention to the interference between the robotic arm and the edge of the opening.

In order to achieve the purpose, a system of teaching a robot according to one aspect of the present disclosure is a system of teaching a robot, which includes a teaching unit, and a robot including a robotic arm and a robot controller, the robotic arm being provided with an end effector at a tip-end part of an arm part of the robotic arm, and the robot controller controlling operation of the robotic arm and setting a teach point according to operation of the teaching unit. A workpiece includes an internal space having an opening, and a target object of a work by the end effector exists in the internal space. The robot controller executes causing the robotic arm to perform one of jogging and inching according to a jogging operation or an inching operation to the teaching unit, and determining a possibility that the arm part interferes with an edge of the opening while the robotic arm is jogging or inching.

According to this configuration, it is unnecessary to pay attention to the interference between the robotic arm and the edge of the opening when the teaching is performed for the work inside the internal space having the opening by operating the teaching unit.

Effect of the Disclosure

According to the present disclosure, a method and system for teaching a robot, unnecessary of paying attention to an interference between a robotic arm and an edge of an opening when a teaching is performed for a work inside an internal space having the opening by operating a teaching unit, can be provided.

MODES FOR CARRYING OUT THE DISCLOSURE

Figure 1:
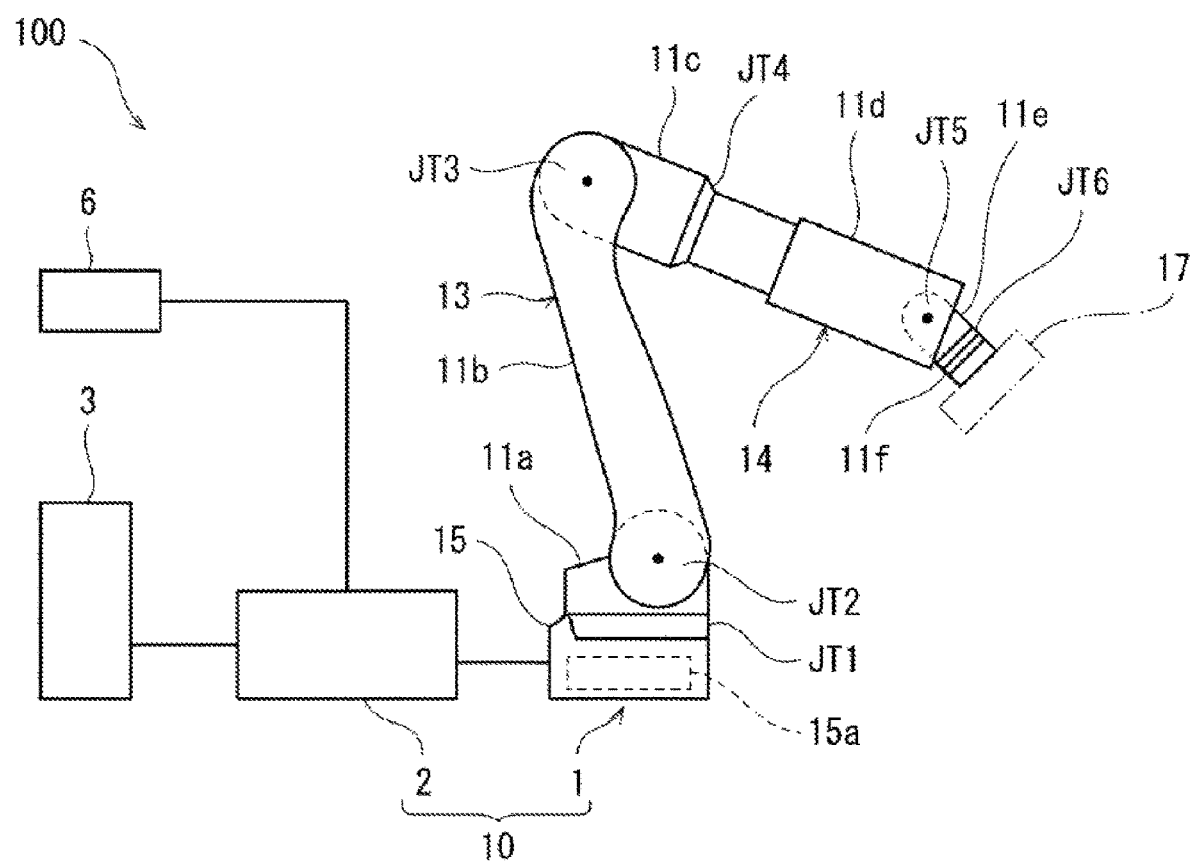
FIG. 1 is a schematic view illustrating a configuration of a robot teaching system according to one embodiment of the present disclosure.

Below, one preferred embodiment of the present disclosure is described with reference to the drawings. Note that the same reference characters are given to the same or corresponding elements throughout the drawings to omit description. Moreover, the accompanying drawings are for illustrating the present disclosure. Therefore, elements irrelevant to the present disclosure may be omitted, dimensions may be inaccurate for exaggeration, elements may be simplified, and shapes of the same elements in the plurality of drawings may be inconsistent. Moreover, the present disclosure is not limited to the embodiment described below.

Embodiment

[Configuration of Hardware]

FIG. 1 is a schematic view illustrating a configuration of a robot teaching system according to one embodiment of the present disclosure.

Referring to FIG. 1, a robot teaching system 100 of this embodiment is provided with a robot 10 including a robotic arm 1 and a robot controller 2, a teaching unit 3, and a warning unit 6.

<Robotic Arm>

The robotic arm 1 includes a pedestal 15, an arm part 13 supported by the pedestal 15, and an end effector 17 attached to a wrist part 14 which constitutes a tip-end part of the arm part 13. The pedestal 15 is provided with a pedestal moving mechanism 15a, and is movable on a traveling path 31 which will be described later (see FIG. 3). As described above, in the present disclosure, the robotic arm 1 is defined to include the end effector 17 and the pedestal moving mechanism 15a.

As illustrated in FIG. 1, the robotic arm 1 is an articulated robotic arm having a plurality of (three or more) joints JT1-JT6, and is comprised of a plurality of links 11a-11f serially coupled to each other. In more detail, at the first joint JT1, the pedestal 15 and a base-end part of the first link 11a are coupled to each other rotatably about an axis extending in the vertical direction. At the second joint JT2, a tip-end part of the first link 11a and a base-end part of the second link 11b are coupled to each other rotatably about an axis extending in the horizontal direction. At the third joint JT3, a tip-end part of the second link 11b and a base-end part of the third link 11c are coupled to each other rotatably about an axis extending in the horizontal direction. At the fourth joint JT4, a tip-end part of the third link 11c and a base-end part of the fourth link 11d are coupled to each other rotatably about an axis extending in a longitudinal direction of the fourth link 11c. At the fifth joint JT5, a tip-end part of the fourth link 11d and a base-end part of the fifth link 11e are coupled to each other rotatably about an axis perpendicular to a longitudinal direction of the link 11d. At the sixth joint JT6, a tip-end part of the fifth link 11e and a base-end part of the sixth link 11f are coupled to each other rotatably in a twisted manner. A mechanical interface is provided at a tip-end part of the sixth link 11f. The end effector 17 corresponding to the work of the robotic arm 1 is detachably attached to the mechanical interface. The end effector 17 is, for example, a spray gun, a welding gun, and a nutrunner.

In this example, the robotic arm 1 is comprised of a 6-axis articulated robotic arm, and the pedestal moving mechanism 15a constitutes a seventh axis which is a redundant axis of the robotic arm 1.

<Robot Controller>

The robot controller 2 controls operation of the robotic arm 1. The robot controller 2 is placed at a suitable location in a work environment where the robot 10 is installed. Note that the controller 2 may be provided inside the pedestal 15 of the robotic arm 1.

<Teaching Unit>

The teaching unit 3 is a device for teaching the robot 10. The robot controller 2 executes controls according to the operation of the teaching unit 3 to operate the robotic arm 1, to set a teach point, or to set a defined point of an opening which will be described later.

<Warning Unit>

The warning unit 6 alerts an operator. Although the warning unit 6 may be a buzzer, PATLITE®, a speaker, etc., the buzzer is used here as the warning unit 6.

[Configuration of Control System]

Figure 2:
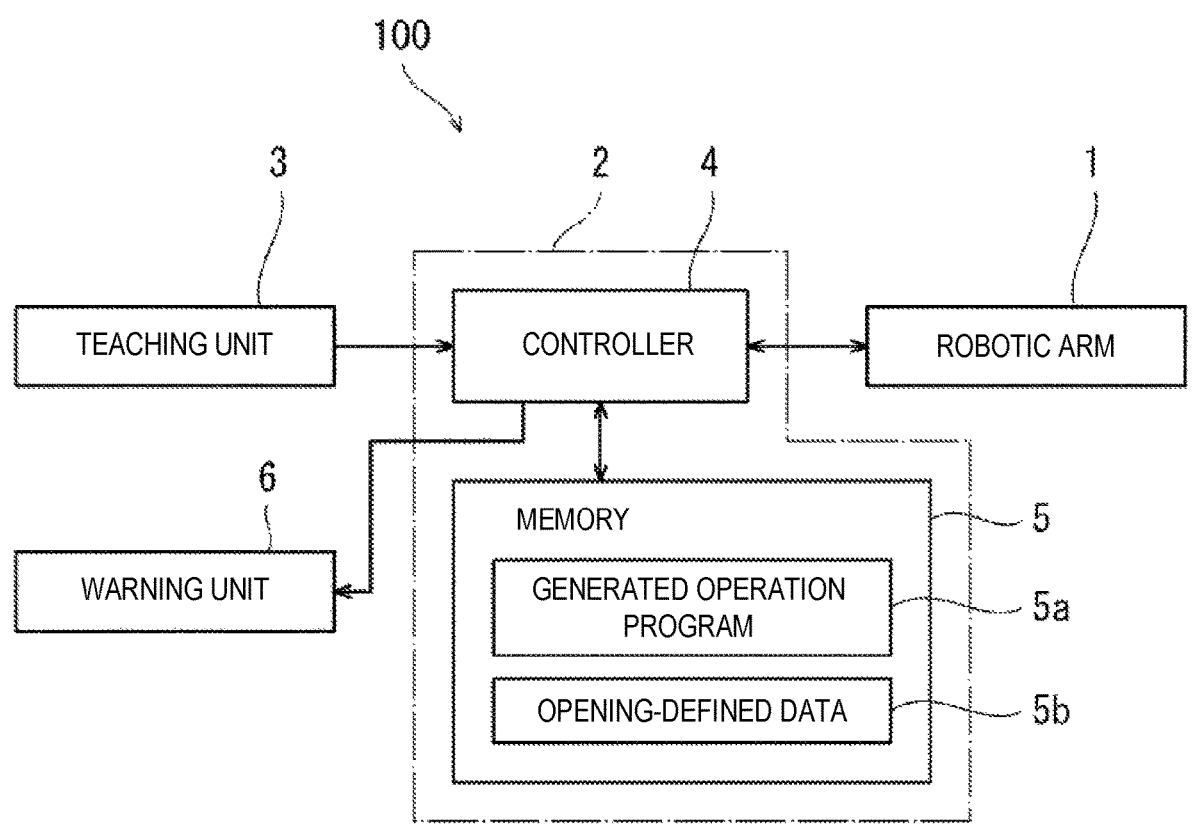
FIG. 2 is a functional block diagram illustrating a configuration of a control system of the robot teaching system of FIG. 1.

FIG. 2 is a functional block diagram illustrating a configuration of a control system of the robot teaching system 100 of FIG. 1.

Referring to FIG. 2, the teaching unit 3 is provided with a user interface (not illustrated), and as the user interface, a starting part, an ending part, a mode switching part, a jogging part, an inching part, an opening selecting part, a teach-point setting part, and a defined-point setting part are provided. When the operator operates the starting part, the ending part, the mode switching part, the jogging part, the inching part, the opening selecting part, the teach-point setting part, and the defined-point setting part, a starting command, an ending command, a mode switching command, a jogging command, an inching command, an opening selecting command, a teach-point setting command, and a defined-point setting command are outputted to the robot controller 2, respectively, as operation signals. The user interface may be provided as hardware, or may be displayed as operation ranges on a display unit. The mode switching part can switch a mode between a teaching mode, an opening definition mode, and a repeating mode. "Jogging" refers to an operation in which the robotic arm 1 operates while an input operation (pressing operation when the user interface is a push-button) is performed to the user interface. "Inching" refers to an operation in which the robotic arm 1 operates by a given operating amount (given distance) when one input operation is performed to the user interface. The opening selecting part is configured so that the operator can select the opening. The operator selects the opening and operates the opening selecting part.

Moreover, "positions" of the end effector 17, a workpiece 21 (see FIG. 3), an opening 22 (see FIG. 3), and a target object of the work refer to positions in a base coordinate system of the robot 10.

The teaching unit 3 is comprised of, for example, an information processor such as a teach pendant, a portable information terminal, and a personal computer. The portable information terminal is, for example, a tablet, a smartphone, and a cellular phone. The teaching unit 3 and the robot controller 2 may be connected to each other wiredly or wirelessly for communication.

The robot controller 2 includes a controller 4 and a memory 5. The robot controller 2 is comprised of a processing unit including a processor and a memory. The processing unit is, for example, an FPGA (Field-Programmable Gate Array), a microcontroller, a PLC (Programmable Logic Controller), and a microprocessor. Here, for example, the robot controller 2 is comprised of the FPGA, the controller 4 is comprised of a CPU of the FPGA, and the memory 5 is comprised of a memory of the FPGA.

The memory 5 stores a generated operation program 5a and opening-defined data 5b. The generated operation program 5a is an operation program for the robot 10, which is generated by a teaching control of the robot teaching system 100. The opening-defined data 5b is data generated by a defined-point setting control for the opening 22 which will be described later. Note that the memory 5 stores, in advance, data (not illustrated) of a plurality of openings of the workpiece 21.

The controller 4 reads and executes a given control program stored in the memory 5, and outputs a control signal to the robotic arm 1. When the controller 4 outputs an arm part control signal as the control signal, the joints of the arm part rotate according to the arm part control signal. When the controller 4 outputs an end effector control signal as the control signal, the end effector 17 operates according to the end effector control signal. When the controller 4 outputs a pedestal-moving-mechanism control signal as the control signal, the pedestal moving mechanism 15a moves according to the pedestal-moving-mechanism control signal. These controls may be a feedforward control or a feedback control. In this example, the feedback control is adopted.

When the mode switching command is inputted from the teaching unit 3, the controller 4 switches the operation mode of the robot 10 according to the mode switching command between the teaching mode, the opening definition mode, and the repeating mode.

The controller 4 switches the mode of the robot 10 to the teaching mode when the mode switching command to the teaching mode is inputted. In this teaching mode, when the opening selecting command is inputted, the controller 4 selects an opening according to the opening selecting command, from the plurality of openings which correspond to the opening-defined data 5b stored in the memory 5. Then, when the jogging command is inputted, the controller 4 causes the robotic arm 1 to perform the jogging operation, and when the inching command is inputted, the controller 4 causes the robotic arm 1 to perform the inching operation. At this time, the controller 4 checks whether the arm part 13 of the robotic arm 1 may interfere with an edge of the selected opening 22. Then, when the teach-point setting command is inputted, the controller 4 sets a teach point, and generates the operation program 5a for the robot 10 based on the set teach point. Then, the controller 4 stores the generated operation program 5a in the memory 5.

When the mode switching command to the opening definition mode is inputted, the controller 4 switches the mode of the robot 10 to the opening definition mode. In the opening definition mode, when the opening selecting command is inputted, the controller 4 selects the opening 22 selected by the opening selecting command, from the data of the plurality of openings of the workpiece 21 stored in the memory 5. When the jogging command or the inching command is inputted, the controller 4 causes the robotic arm 1 to perform the jogging operation or the inching operation. Then, when the defined-point setting command is inputted, the controller 4 sets the defined point of the opening 22. When all the defined points are set, the controller 4 stores the set defined points in the memory 5 so as to be associated with the selected opening 22 (and the workpiece 21).

When the mode switching command to the repeating mode is inputted, the controller 4 reads the generated operation program 5a from the memory 5 and executes it so as to operate the robot 10 in accordance with the generated operation program 5a.

When determined that the arm part 13 of the robotic arm 1 may interfere with the edge of the selected opening 22, the controller 4 causes the warning unit 6 to alert. In this example, the controller 4 causes as the warning unit 6 the buzzer to sound.

<Work Environment>

Figure 3:
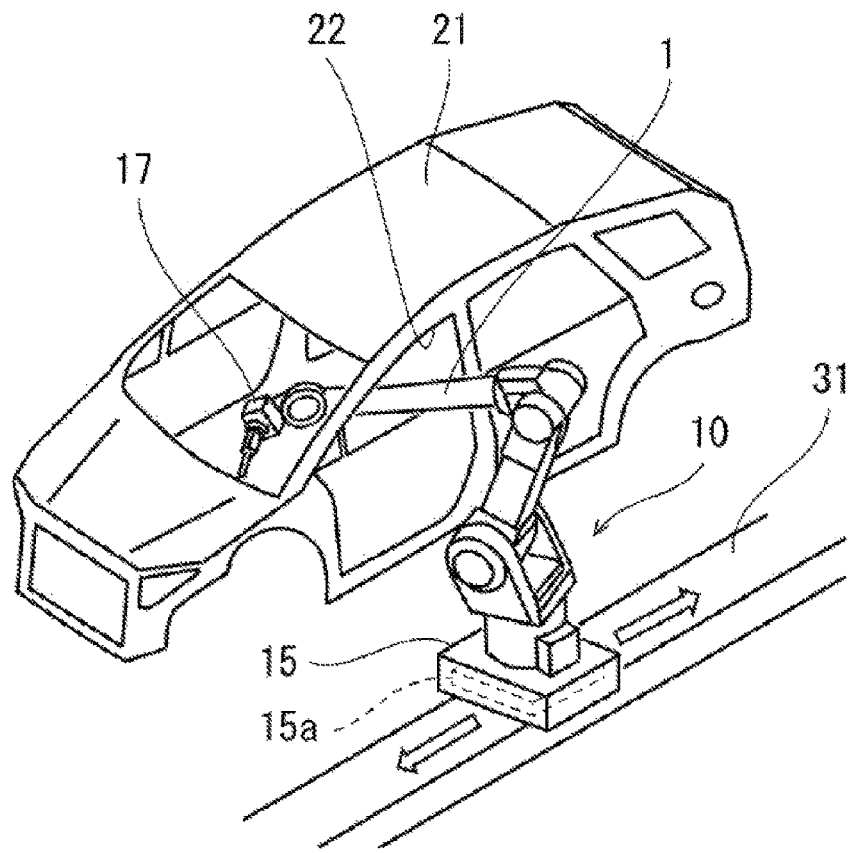
FIG. 3 is a perspective view illustrating a situation where a robot is taught a work inside a workpiece, which is performed through an opening of the workpiece.

FIG. 3 is a perspective view illustrating a situation where the robot 10 is taught a work inside the workpiece, which is performed through the opening of the workpiece.

Referring to FIGS. 1 and 3, the robot 10 is taught an operation in which the robotic arm 1 enters into the workpiece 21 through the opening 22 of the workpiece 21, and the end effector 17 performs the work inside the workpiece 21. The pedestal 15 of the robotic arm 1 of the robot 10 is placed on the traveling path 31 provided at the work site.

In detail, the pedestal 15 is fitted slidably to a linear guide (not illustrated) which extends in an extending direction of the traveling path 31. The pedestal 15 is moved by the pedestal moving mechanism 15a on the traveling path 31 in the extending direction of the traveling path 31 as illustrated by arrows.

The extending direction of the traveling path 31 is parallel to a transferring direction of the workpiece 21 in an assembly line of the workpiece 21.

The workpiece 21 may be any workpiece in which an internal space having the opening 22 is formed in a manufacturing process. In this example, the workpiece 21 is a vehicle body of an automobile under assembly, the internal space of the workpiece 21 is an internal space of the vehicle body, the openings 22 of the internal space are two windows of left doors and two windows of right doors of the vehicle body, a window in a front part of the vehicle body, a window in a rear part of the vehicle body, and windows in rear side parts of the vehicle body. The total number of the openings 22 is eight.

In this example, the robot 10 is provided with a spray gun as the end effector 17 at the tip-end part of the robotic arm 1, and performs a sealing work inside the cabin of the vehicle body as the workpiece 21.

[Opening-Defined Data]

Figure 4:
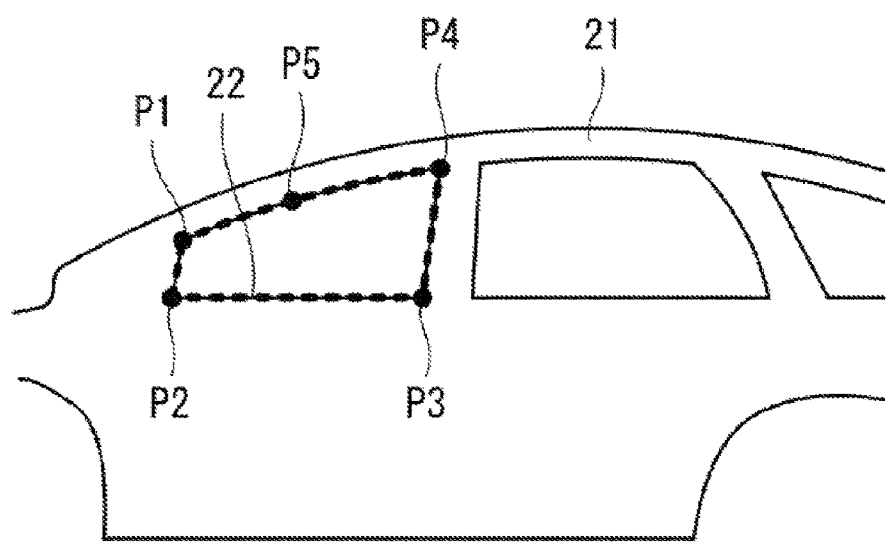
FIG. 4 is a schematic view illustrating defined points which define the opening of the workpiece.

FIG. 4 is a schematic view illustrating one example of the defined points which define the opening of the workpiece. Referring to FIG. 4, five defined points P1-P5 are illustrated, which define the opening 22 (window) of the workpiece 21 (vehicle body).

The opening 22 of the workpiece 21 is defined by positions of the plurality of defined points P1-P5, an order of defining the plurality of defined points P1-P5, and a plurality of straight lines connecting the plurality of defined points P1-P5 in the defined order. In this example, the defined order of the defined points P1-P5 is that the defined point P1 is the first, the defined point P2 is the second, the defined point P3 is the third, the defined point P4 is the fourth, and the defined point P5 is the fifth. By connecting the plurality of defined points P1-P5 with the plurality of (here, five) straight lines in the defined order, a two-dimensional or three-dimensional polygon is formed, and the polygon defines (identifies) a shape and a position of the opening 22.

The positions and the defined order of the plurality of defined points P1-P5 are stored in the memory 5 as the opening-defined data 5b so that the positions and the defined order correspond to (are associated with) each other, and also correspond to (are associated with) the workpiece 21 and the opening 22.

[Interference Check]

Figure 5:
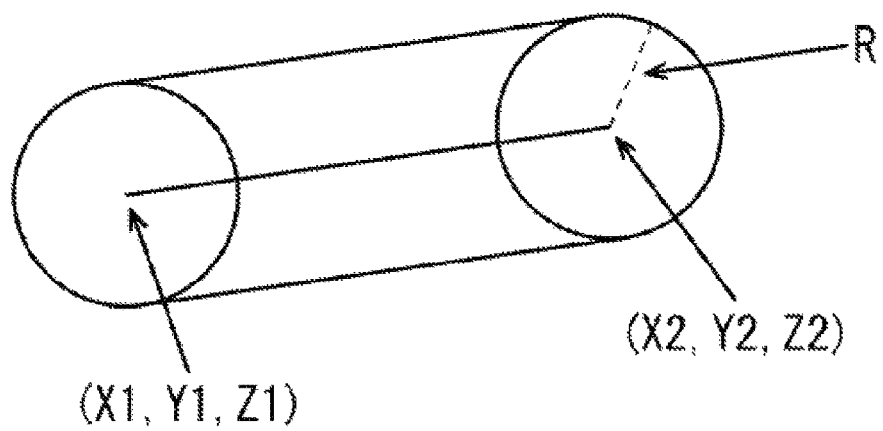
FIG. 5 is a schematic view illustrating a modeling of a link of an arm part of a robotic arm.
Figure 6:
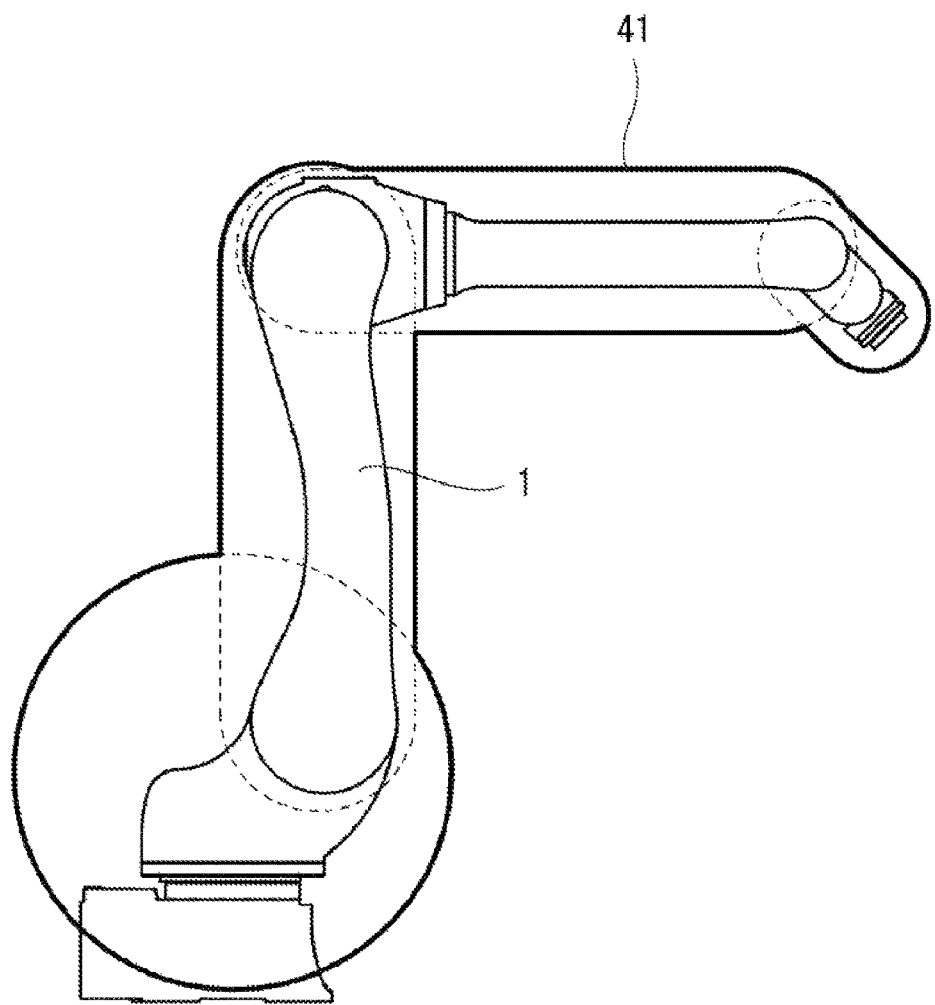
FIG. 6 is a schematic view illustrating a link model of the arm part of the robotic arm.

Next, an interference check executed by the controller 4 is described. FIG. 5 is a schematic view illustrating a modeling of the link of the arm part of the robotic arm. FIG. 6 is a schematic view illustrating a link model of the arm part of the robotic arm.

A well-known method may be used for determining the possibility of the interference between the arm part 13 of the robotic arm 1 and the edge of the opening 22 (hereinafter, referred to as the "interference check"). In this embodiment, the interference check between the arm part 13 of the robotic arm 1 and the edge of the opening 22 is executed as follows.

In this embodiment, the link model of the robotic arm 1 is used as illustrated in FIG. 5. In this link model, the shape of the arm part 13 of the robotic arm 1 is specified by (a) a radius R indicating a thickness of the link model in a capsule shape, (b) coordinates of a start point (X1, Y1, Z1), (c) coordinates of an end point (X2, Y2, Z2), and (d) a synchronous-axis parameter indicating which axes (first to sixth joints JT1-JT6) operate synchronously. In this example, as illustrated in FIG. 5, the capsule shape refers to a shape having a cylindrical part with the radius R, and hemispherical parts with the radius R formed in both ends of the cylindrical part. In this capsule-shape link model, a straight line connecting the start point (X1, Y1, Z1) and the end point (X2, Y2, Z2) indicates a representative "line segment" of the link model, and the radius R indicates a "thickness" of the link model.

Here, the coordinates of the specified start point and end point are positional coordinates of each link when the arm part 13 of the robotic arm 1 is in a reference posture (when axis angles of all the joints are 0°).

The link model of the arm part 13 of the robotic arm 1 is as illustrated in FIG. 6. In FIG. 6, the reference character "41" indicates the link model.

The interference check between the arm part 13 of the robotic arm 1 and the edge of the opening 22 is executed by calculating a shortest distance between the line segments indicating the shape of the opening 22 (straight lines connecting the defined points) and the line segment of the capsule-shape link model, and determining whether the shortest distance is smaller than the thickness R of the link model. In this case, a spatial position of the link model changes according to the angle of each axis of the arm part 13 of the robotic arm 1. Therefore, as the angle of each axis of the link model, an angle called a "virtual command value" is used. The "virtual command value" is an angle of each axis at a position to which the arm part 13 under operation is to be moved after a given period of time. This given period of time is determined based on a period of time required for stopping the arm part 13. By executing the interference check using this "virtual command value," the interference can be detected before the actual interference occurs, and thus, the actual interference can be prevented in advance.

[Operation]

The operation of the robot teaching system 100 configured as described above is described with reference to FIGS. 3, 4, 7, and 8. The operation of the robot teaching system 100 is implemented by the controller 4 of the robot controller 2 controlling the robot 10.

<Teaching Control>

Figure 7:
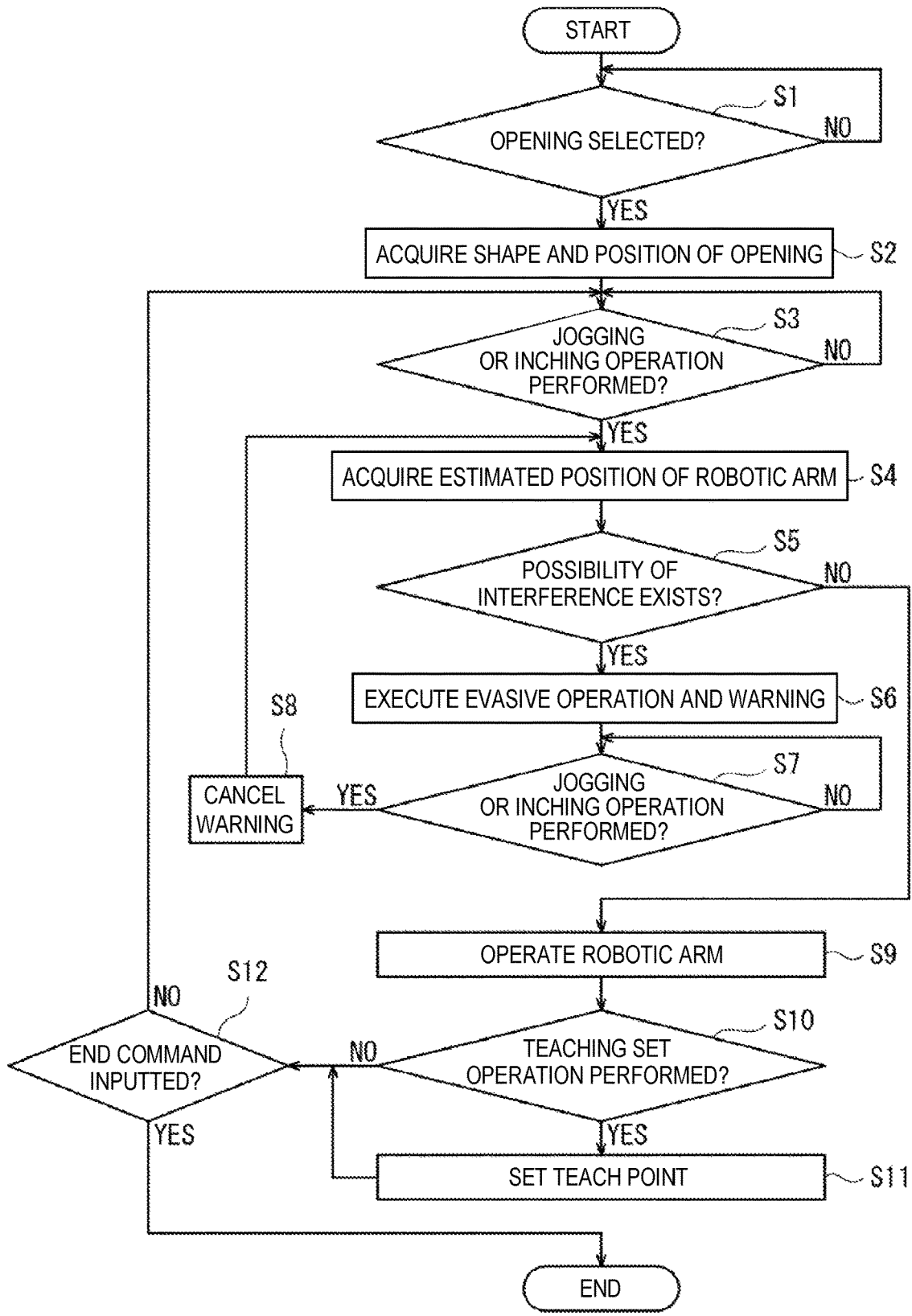
FIG. 7 is a flowchart illustrating a teaching control by a robot controller.

FIG. 7 is a flowchart illustrating the teaching control of the robot controller 2.

Referring to FIGS. 2, 3, 4, and 7, the operator first operates the mode switching part of the teaching unit 3 in order to switch the mode of the robot 10 to the teaching mode. Then, when the operator operates the starting part of the teaching unit 3, the teaching control starts.

First, the controller 4 stands by until the opening 22 is selected (NO at Step S1). In detail, the controller 4 stands by until the opening selecting command is inputted from the teaching unit 3.

When the operator operates the opening selecting part of the teaching unit 3, the controller 4 reads opening-defined data of the selected opening 22 from the memory 5, and acquires the shape and position of the selected opening 22 by connecting the plurality of defined points P1-P5 with straight lines (Step S2).

Next, the controller 4 stands by until a jogging or an inching operation is performed (NO at Step S3). In detail, the controller 4 stands by until the jogging command or the inching command is inputted from the teaching unit 3.

When the operator operates the jogging part or the inching part of the teaching unit 3, the controller 4 calculates the position of the robotic arm 1 corresponding to the inputted jogging command or inching command, and sets it as an estimated position (Step S4).

Next, the controller 4 determines whether the robotic arm 1 may interfere with the edge of the opening 22 based on the estimated position of the robotic arm 1 and the shape and position of the selected opening 22 (Step S5). The controller 4 determines the possibility of the interference between the arm part 13 of the robotic arm 1 and the edge of the opening 22 based on the interference check as described above.

When determined that the arm part 13 of the robotic arm 1 and the edge of the opening 22 may interfere (YES at Step S5), the controller 4 executes an evasive operation and a warning (Step S6). In detail, the controller 4 first causes the warning unit 6 to alert. Moreover, as the evasive operation, the controller 4 controls the pedestal moving mechanism 15a of the pedestal 15 of the robotic arm 1 so that the pedestal 15 moves to take a posture where the arm part 13 separates from the edge of the opening 22. Alternatively, the controller 4 stops the operation of the robotic arm 1, or decreases an operation speed of the robotic arm 1.

Next, the controller 4 stands by until the jogging or the inching operation is performed (NO at Step S7).

When the operator operates the jogging part or the inching part of the teaching unit 3, the controller 4 cancels the alert by the warning unit 6 (Step S8), and returns the control to Step S4.

On the other hand, when determined that the arm part 13 of the robotic arm 1 and the edge of the opening 22 do not interfere (NO at Step S5), the controller 4 operates the robotic arm 1 to be located at the estimated position (Step S9). Next, the controller 4 determines whether a teach-point setting operation is performed (Step S10). In detail, the controller 4 determines whether the teach-point setting command is inputted from the teaching unit 3. If the teach-point setting command is not inputted within a given period of time (NO at Step S10), the controller 4 proceeds the control to Step S12.

On the other hand, when the teach-point setting command is inputted within the given period of time (YES at Step 10), the controller 4 sets the position of the end effector 17 of the robotic arm 1 as the teach point (Step S11). Next, the controller 4 determines whether the ending command is inputted from the teaching unit 3 (Step S12). In detail, the controller 4 determines whether the ending command is inputted from the teaching unit 3.

If the ending command is not inputted (NO at Step S12), the controller 4 returns the control to Step S3.

Then, according to the operation by the operator to the jogging part or the inching part of the teaching unit 3, and the operation by the operator to the teach-point setting part of the teaching unit 3, the controller 4 repeats Steps S3 to S12. While repeating Steps S3 to S12, as illustrated in FIG. 3, the robotic arm 1 enters the end effector 17 into the internal space of the workpiece 21 (here, inside the vehicle body) through the opening 22 of the workpiece 21, and then, the teaching for the work against the target object is performed by using the end effector 17 in this internal space while performing the jogging operation or the inching operation. Then, when the teaching for the work against the target object is finished, the operator operates the ending part of the teaching unit 3.

Then, the controller 4 determines that the ending command is inputted (YES at Step S12), and ends this teaching control.

Therefore, the teaching for the work inside the internal space having the opening 22 can be carried out by operating the teaching unit 3. Moreover, during the teaching, it is unnecessary to pay attention to the interference between the arm part 13 of the robotic arm 1 and the edge of the opening 22.

<Opening Definition Control>

Figure 8:
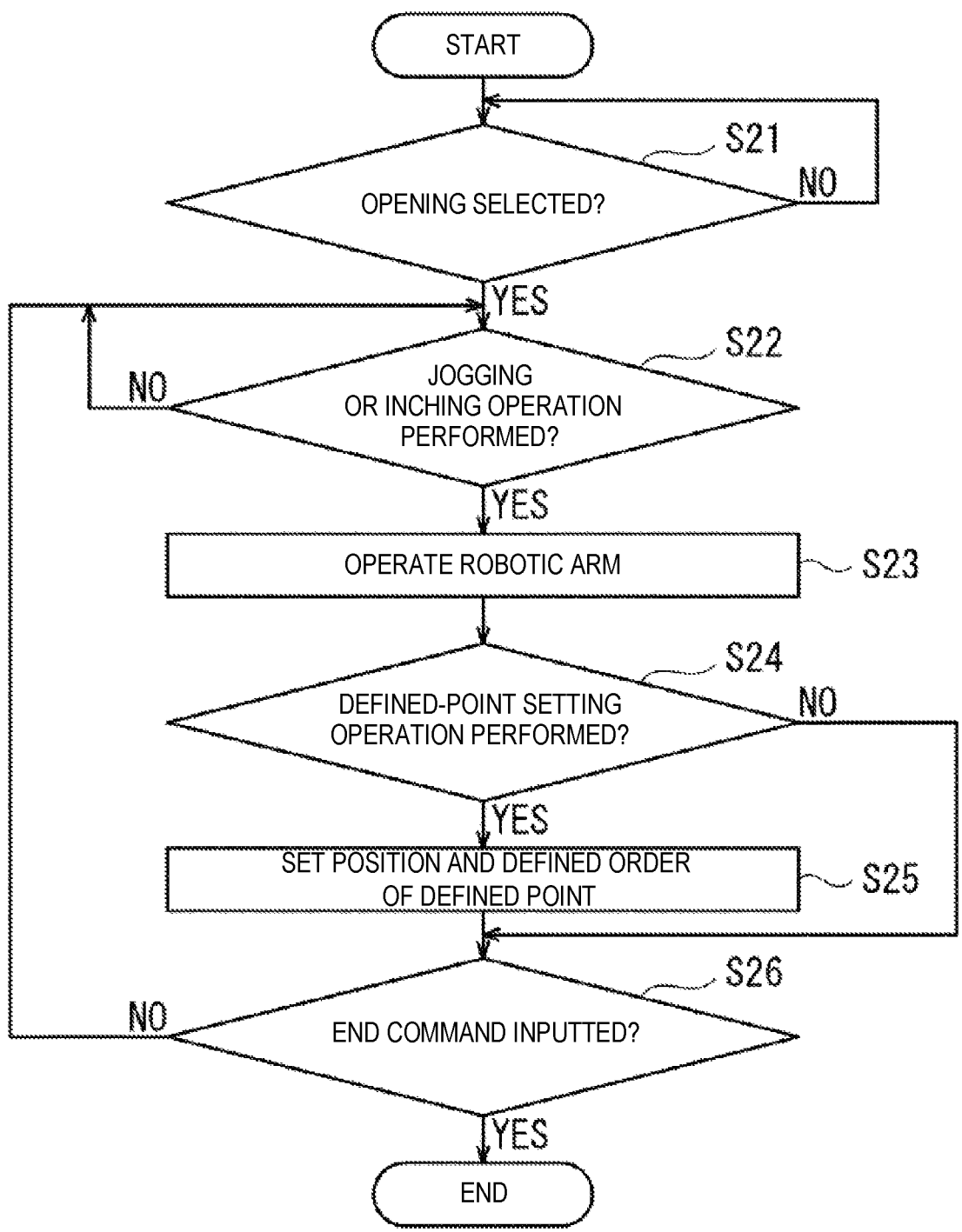
FIG. 8 is a flowchart illustrating an opening definition control of the workpiece by the robot controller.

FIG. 8 is a flowchart illustrating an opening definition control of the workpiece by the robot controller. Referring to FIGS. 2, 4, and 8, the operator first operates the mode switching part of the teaching unit 3 in order to switch the mode of the robot 10 to the opening definition mode. Then, when the operator operates the starting part of the teaching unit 3, the opening definition control starts.

First, the controller 4 stands by until the opening 22 is selected (NO at Step S21). In detail, the controller 4 stands by until the opening selecting command is inputted from the teaching unit 3.

When the operator operates the opening selecting part of the teaching unit 3, the controller 4 selects the selected opening 22 from the data of the plurality of openings of the workpiece 21 stored in the memory 5 (YES at Step S21).

Next, the controller 4 stands by until the jogging or the inching operation is performed (NO at Step S22). In detail, the controller 4 stands by until the jogging command or the inching command is inputted from the teaching unit 3.

When the operator operates the jogging part or the inching part of the teaching unit 3, the controller 4 locates the end effector 17 of the robotic arm 1 at the position corresponding to the inputted jogging command or the inching command (Step S23).

Next, the controller 4 determines whether a defined-point setting operation is performed (Step S24). In detail, the controller 4 determines whether the defined-point setting command is inputted from the teaching unit 3 within a given period of time.

When the operator operates the defined-point setting part of the teaching unit 3, the controller 4 determines that the determined-point setting operation is performed (YES at Step S24), and sets the position and the defined order of the defined point so that they are associated with each other, and are also associated with the opening 22.

On the other hand, when the defined-point setting command is not inputted from the teaching unit 3 within the given period of time (NO at Step S24), the controller 4 proceeds the control to Step S26.

Next, the controller 4 determines whether the ending command is inputted from the teaching unit 3 (Step S26).

When the ending command is not inputted, the controller 4 returns the control to Step S22.

Then, according to the operation by the operator to the jogging part or the inching part of the teaching unit 3, the controller 4 repeats Steps S22 to S24, and S26. While repeating Steps S22 to S24, and S26, as illustrated in FIG. 4, the robotic arm 1 locates the tip-end part of the end effector 17 at the defined point P1 of the opening 22. Then, when the operator operates the defined-point setting part of the teaching unit 3, at Step S24, the controller 4 determines that the defined-point operation is performed (YES at Step S24), and the controller 4 sets the position and the defined order (first) of the defined point P1 (Step S25).

After this, the operator operates similarly, and the controller 4 operates according to the operation by the operator so that the positions and the defined orders of the respective defined points P2-P5 are set. Then the operator operates the ending part of the teaching unit 3.

Then, the controller 4 determines that the ending command is inputted (YES at Step S26), and ends the opening definition control.

Accordingly, the plurality of defined-point settings for the opening 22 are executed.

Other Embodiments

Although in the above embodiment the robot 10 is provided with the redundant axis comprised of the pedestal moving mechanism 15a and the traveling path 31, the redundant axis may be omitted.

Moreover, although in the above embodiment the opening 22 is defined by using the robot 10 at the work site, the opening 22 may be defined separately. For example, data which identifies the shape of the opening 22 and the position of the workpiece 21 may be created in advance based on design data for the workpiece 21, and the created data may be stored in the memory 5 as the opening-defined data 5b.

Moreover, in the above embodiment the interference check, the warning, and the evasive operation may be executed in the repeating mode.

It is apparent for a person skilled in the art from the above description that many improvements and other embodiments of the present disclosure are possible. Therefore, the above description is to be interpreted only as illustration.

INDUSTRIAL APPLICABILITY

The method and system for teaching the robot according to the present disclosure is useful as a method and system for teaching a robot, unnecessary of paying attention to an interference between a robotic arm and an edge of an opening when a teaching is performed for a work in an internal space having the opening by operating a teaching unit.

DESCRIPTION OF REFERENCE CHARACTERS

1 Robotic Arm
2 Robot Controller
3 Teaching Unit
4 Controller
5 Memory
6 Warning Unit
10 Robot
15 Pedestal
15a Pedestal Moving Mechanism
17 End Effector
21 Workpiece
22 Opening
31 Traveling Path
100 Robot Teaching System

What is claimed is:

1. A method of teaching a robot including a robotic arm and a robot controller, the robotic arm being provided with an end effector at a tip-end part of an arm part of the robotic arm, and the robot controller controlling operation of the robotic arm and setting a teach point according to operation of an operation inputter,
wherein a workpiece includes an internal space having an opening, and a target object of a work by the end effector exists in the internal space,
the method comprising performing a first process, the first process comprising:
estimating by the robot controller a position of the robotic arm that corresponds to a jogging operation or an inching operation of the operation inputter;
determining by the robot controller a possibility that the arm part interferes with an edge of the opening in a case that the robotic arm jogs to the estimated position of the robotic arm according to the jogging operation or inches to the estimated position of the robotic arm according to the inching operation; and
upon determining that there is no possibility of interference of the arm part with the edge of the opening, causing by the robot controller the robotic arm to jog to the estimated position of the robotic arm according to the jogging operation or inch to the estimated position of the robotic arm according to the inching operation.

2. The method of claim 1, further comprising performing a second process using the first process, wherein the second process comprises
operating the robotic arm by the jogging operation or the inching operation of the operation inputter so that, after the robotic arm enters the end effector into the internal space of the workpiece through the opening, the robotic arm jogs according to the jogging operation or inches according to the inching operation to perform a work against the target object inside the internal space using the end effector, and wherein
the second process further comprises
setting a plurality of teach points that realize the operation of the robotic arm in the second process, by a teach-point setting operation of the operation inputter.

3. The method of claim 1, further comprising, when determined that there is the possibility of the arm part interfering with the edge of the opening, controlling the operation of the robotic arm by the robot controller to evade the interference between the arm part and the edge of the opening, or controlling a warning unit by the robot controller to alert.

4. The method of claim 2, further comprising
performing a third process, the third process comprising repeating:
locating the end effector at a defined point that defines the opening of the workpiece, by the jogging operation or the inching operation of the operation inputter; and
setting by the robot controller a position and a defined order of the defined point so as to be associated with each other, by a defined-point setting operation of the operation inputter,
wherein the opening is identified by connecting a plurality of defined points with straight lines in the defined order, the plurality of defined points being set repeatedly in the third process.

5. The method of claim 4, wherein the internal space of the workpiece includes a plurality of openings,
the method further comprising performing a fourth process, the fourth process comprising:
selecting one of the plurality of openings of the workpiece by a selecting operation of the operation inputter before the second process,
wherein, for the selected opening, the second process, a combination of the second and third processes, or a combination of the second, third and fourth processes is performed.

6. The method of claim 1, wherein the workpiece is a vehicle body of an automobile under assembly, and the opening is a window of a door of the vehicle body.

7. A system of teaching a robot, comprising:
an operation inputter; and
a robot including a robotic arm and a robot controller, the robotic arm being provided with an end effector at a tip-end part of an arm part of the robotic arm, and the robot controller controlling operation of the robotic arm and setting a teach point according to operation of the operation inputter,
wherein a workpiece includes an internal space having an opening, and a target object of a work by the end effector exists in the internal space, and
the robot controller executes a first process, the first process comprising:
in response to a jogging operation or an inching operation to the operation inputter, estimating a position of the robotic arm that corresponds to the jogging operation or the inching operation;
determining a possibility that the arm part interferes with an edge of the opening in a case that the robotic arm jogs to the estimated position of the robotic arm according to the jogging operation or inches to the estimated position of the robotic arm according to the inching operation; and
upon determining that there is no possibility of interference of the arm part with the edge of the opening, causing the robotic arm to jog to the estimated position of the robotic arm according to the jogging operation or inch to the estimated position of the robotic arm according to the inching operation.

8. The system of claim 7, wherein the robotic controller executes a second process using the first process, the second process comprising
operating the robotic arm based on the jogging operation or the inching operation to the operation inputter so that, after the robotic arm enters the end effector into the internal space of the workpiece through the opening, the robotic arm jogs according to the jogging operation or inches according to the inching operation to perform a work against the target object inside the internal space using the end effector, and
the second process further comprising
setting a plurality of teach points that realize the operation of the robotic arm in the second process, according to a teach-point setting operation to the operation inputter.

9. The system of claim 7, wherein, when determined that there is the possibility of the arm part interfering with the edge of the opening, the robot controller controls the operation of the robotic arm to evade the interference between the arm part and the edge of the opening, or the robot controller controls a warning unit to alert.

10. The system of claim 8, wherein the robot controller further executes a third process, the third process comprising repeating:
locating the end effector at a defined point that defines the opening of the workpiece, according to the jogging operation or the inching operation to the operation inputter; and
setting a position and a defined order of the defined point so as to be associated with each other, according to a defined-point setting operation to the operation inputter, and
wherein the opening is identified by connecting a plurality of defined points with straight lines in the defined order, the plurality of defined points being set repeatedly in the third process.

11. The system of claim 10, wherein the internal space of the workpiece includes a plurality of openings,
wherein the robot controller further executes (c) a fourth process, the fourth process comprising
selecting one of the plurality of openings of the workpiece according to a selecting operation to the operation inputter before the second process, and
wherein, for the selected opening, the robot controller executes the second process, a combination of the second and third processes, or a combination of the second, third and fourth processes.

12. The system of claim 7, wherein the workpiece is a vehicle body of an automobile under assembly, and the opening is a window of a door of the vehicle body.

* * * * *